United States Patent [19]
Das et al.

[11] 4,304,701
[45] Dec. 8, 1981

[54] AQUEOUS ACRYLIC POLYMER DISPERSIONS

[75] Inventors: Suryya K. Das, Pittsburgh; Charles M. Kania, Tarentum, both of Pa.

[73] Assignee: PPG Industries, Inc., Pittsburgh, Pa.

[21] Appl. No.: 44,424

[22] Filed: Jun. 1, 1979

[51] Int. Cl.³ ........................................... C08F 265/02
[52] U.S. Cl. .................. 260/29.6 RW; 260/29.6 WB; 525/286
[58] Field of Search ............ 260/29.6 RW, 29.6 WB; 525/286

[56] References Cited

U.S. PATENT DOCUMENTS

| | | | |
|---|---|---|---|
| 3,026,281 | 3/1962 | Harren | 260/29.6 WB |
| 3,035,004 | 5/1962 | Glavis | 260/29.6 RW |
| 3,440,199 | 4/1969 | Lindemann | 260/29.6 RW |
| 3,810,859 | 5/1974 | Mikofalvy | 260/29.6 RW |
| 3,894,980 | 7/1975 | DeTommaso | 260/29.6 RW |
| 3,933,706 | 1/1976 | Momiyama | 260/22 S |
| 4,033,920 | 7/1977 | Isozaki | 260/29.6 H |
| 4,064,087 | 12/1977 | Das | 260/29.6 RB |
| 4,092,287 | 5/1978 | Ito | 260/29.6 RW |
| 4,138,381 | 2/1979 | Chang | 260/29.6 TA |

*Primary Examiner*—Paul R. Michl
*Attorney, Agent, or Firm*—William J. Uhl

[57] ABSTRACT

Ungelled, stable aqueous dispersions of acrylic polymers, containing carboxyl and epoxy functionality, and their method of preparation are disclosed. The dispersions are useful in water-based coating compositions. As long as the polymeric product remains dispersed in aqueous medium, stable, curable, one-package coating compositions result. However, when the dispersions are applied to a substrate as a film and the water evaporated, a curing reaction occurs as evidenced by the film becoming harder and more solvent resistant with the passage of time.

30 Claims, No Drawings

AQUEOUS ACRYLIC POLYMER DISPERSIONS

BACKGROUND OF THE INVENTION

The present invention relates to aqueous dispersions of polymeric products. More particularly, this invention relates to ungelled polymeric products which are dispersed in aqueous medium and are stable in this condition but undergo a crosslinking reaction upon removal of the water.

In the field of acrylic polymers, it is known to polymerize alpha, beta-ethylenically unsaturated acids such as acrylic acid or methacrylic acid with other copolymerizable acrylic monomers such as styrene and methyl methacrylate to form polymers with unreacted carboxylic acid groups. These polymers can be treated with bases such as amines to form the polymeric salt which can be dispersed in water.

In preparing ungelled polymers, epoxy group-containing acrylic monomers such as glycidyl acrylate and glycidyl methacrylate are not employed because the epoxy group is reactive with the carboxyl group, particularly in the presence of amine, and gelling or crosslinking of the reactants will occur. This is shown in British Pat. No. 1,538,151 where crosslinked or gelled acrylic polymer articles are formed when alpha, beta-ethylenically unsaturated monocarboxylic acids such as methacrylic acid and epoxy group-containing compounds such as glycidyl methacrylate are copolymerized in a hydrocarbon diluent.

In the present invention, however, alpha, beta-ethylenically unsaturated acids such as acrylic acid and methacrylic acid and epoxy group-containing compounds which contain alpha, beta-ethylenic unsaturation such as glycidyl acrylate and methacrylate are polymerized in a fashion that gelation is avoided.

SUMMARY OF THE INVENTION

In accordance with the present invention, ungelled, stable, aqueous dispersions of polymeric products and their method of preparation are disclosed. The polymeric products are prepared by polymerizing under free radical polymerization conditions (1) a dispersed phase of a polymerizable alpha, beta-ethylenically unsaturated monomer component which includes 1–7 percent by weight based on weight of the polymerizable monomers in (1) and (2) of an epoxy group-containing monomer in the presence of (2) an aqueous dispersion of a base neutralized, particularly an amine neutralized, acid group-containing acrylic polymer dispersant; the molar ratio of acid used in preparing the acrylic polymer dispersant to epoxy group-containing monomer being at least 3/1.

Normally, epoxy group-containing monomers which contain polymerizable alpha, beta-ethylenic unsaturation cannot be copolymerized with an acid group-containing acrylic monomer because of coreaction between the epoxy groups and the carboxyl groups leading to gelation. However, gelation can be avoided and stable products prepared if the polymerization is conducted in the presence of water with a limited amount of epoxy monomer and a controlled ratio of epoxy to acid as described above.

DETAILED DESCRIPTION

The aqueous dispersions of the polymeric products of the present invention are prepared by dispersing in aqueous medium in the presence of an at least partially base neutralized acid group-containing acrylic polymer dispersant an alpha, beta-ethylenically unsaturated monomer component which includes an epoxy group-containing monomer and subjecting the dispersion to free radical polymerization conditions to form ungelled polymeric products dispersed in aqueous medium in a stable condition.

The acrylic polymer dispersant is prepared by polymerizing a mixtuure of alpha, beta-ethylenically unsaturated acrylic monomers which includes an alpha, beta-ethylenically unsaturated carboxylic acid and at least one other copolymerizable ethylenically unsaturated monomer which does not contain groups which are coreactive with the carboxylic acid group such as an epoxy group. The most preferred acrylic polymers are prepared by polymerizing a mixture of vinyl monomers which includes acrylic or methacrylic acid.

Generally, the alpha, beta-ethylenically unsaturated carboxylic acid constitutes from 2 to 50, more preferably 2 to 20 percent by weight of the polymeric product; the percentage being based on total weight of polymerizable monomers used in preparing the polymeric product.

Examples of alpha, beta-ethylenically unsaturated carboxylic acids are those containing up to 10 carbon atoms such as acrylic acid which is a preferred species and alkyl-substituted acrylic acid wherein the alkyl substituents contain from 1 to 7 carbon atoms and in which the substituents may be aliphatic or cycloaliphatic in nature. Examples of suitable alkyl-substituted acrylic acids are methacrylic acid which is another preferred species and ethacrylic acid. Examples of other unsaturated acids are alpha, beta-ethylenically unsaturated dicarboxylic acids such as maleic acid or its anhydride, fumaric acid and itaconic acid. Also, the half esters of these dicarboxylic acids may be employed.

Examples of alpha, beta-ethylenically unsaturated monomers, which are different from and are copolymerizable with the alpha, beta-ethylenically unsaturated carboxylic acids mentioned above, are alkyl esters of methacrylic acid containing from 1 to 3 carbon atoms in the alkyl group such as methyl methacrylate. Use of these particular monomers is preferred because when copolymerized with acrylic acid or methacrylic acid, they result in polymers with relatively high glass transition temperatures which give the most stable systems for the second stage polymerization with the epoxy group-containing monomers. Styrene monomer is also good for this purpose.

Examples of other alpha, beta-ethylenically unsaturated copolymerizable monomers are 1–18 carbon alkyl acrylates and 4–18 carbon alkyl methacrylates. Specific examples of suitable unsaturated monomers of this type include butyl methacrylate, hexyl methacrylate, octyl methacrylate, isodecyl methacrylate, stearyl methacrylate, methyl acrylate, ethyl acrylate, butyl acrylate, hexyl acrylate, 2-ethylhexyl acrylate, octyl acrylate, decyl acrylate and dodecyl acrylate. Besides the alkyl esters of alpha, beta-ethylenically unsaturated carboxylic acids mentioned above, substituted alkyl esters, for example, hydroxyalkyl esters such as hydroxyethyl and hydroxypropyl acrylate and methacrylate can also be used.

Examples of other alpha, beta-ethylenically unsaturated monomers are N-alkoxymethyl acrylamides or methacrylamides such as N-ethoxymethyl and N-butoxymethyl acrylamide and methacrylamide; vinyl aromatic compounds such as styrene, alpha-methyl styrene, alpha-chlorostyrene and vinyl toluene; organic nitriles such as acrylonitrile and methacrylonitrile; allyl monomers such as allyl chloride and allyl cyanide and monomeric dienes such as 1,3-butadiene and 2-methyl-1,3-butadiene.

Acid group-containing acrylic polymers are usually prepared by conventional free radical initiated solution polymerization techniques in which the polymerizable monomers are dissolved in a solvent or a mixture of solvents and polymerized in the presence of a free radical initiator until conversion is complete.

Examples of free radical initiators are those which are soluble in the mixture of monomers such as azobisisobutyronitrile, azobis(alpha, gamma-methylvaleronitrile), tertiary-butyl perbenzoate, tertiary-butyl peracetate, benzoyl peroxide and ditertiary-butyl peroxide.

Optionally, a chain transfer agent which is soluble in the mixture of monomers such as alkyl mercaptans, for example, tertiary-dodecyl mercaptan; ketones such as methyl ethyl ketone, chlorohydrocarbons such as chloroform can be used. A chain transfer agent provides control over the molecular weight to give products having required viscosity for various coating applications. Tertiary-dodecyl mercaptan is preferred because it results in high conversion of monomer to polymeric product.

To prepare the acid group-containing acrylic polymer, the solvent is first heated to reflux and the mixture of polymerizable monomers containing the free radical initiator is added slowly to the refluxing solvent. The reaction mixture is held at polymerizing temperatures so as to reduce the free monomer content to below 1.0 and usually below 0.5 percent.

For use in the process of the invention, the acid group-containing acrylic polymers prepared as described above should preferably have a molecular weight on a weight average basis of about 5000 to 500,000, more preferably 10,000 to 100,000, most preferably 25,000 to 50,000, as determined by gel permeation chromatography using a polystyrene standard.

The acid group-containing acrylic polymer is treated with a base to form a water-dispersible salt thereof. Examples of suitable bases are inorganic bases such as sodium and potassium hydroxides. Preferably the base is an amine. Examples of suitable amines are water-soluble amines including ammonia, primary, secondary and tertiary amines including hydroxyalkyl amines. Examples include ethanolamine, diethanolamine, N-methylethanolamine, dimethylethanolamine, methylamine, ethylamine, diethylamine, trimethylamine, triethylamine and morpholine. The acid group-containing polymer is at least partially neutralized, usually to the extent of at least 20 and more usually at least 40 percent of the total theoretical neutralization.

After the acid group-containing acrylic polymer has been treated with a base, it is dispersed in aqueous medium. The step of dispersion is accomplished by combining the neutralized or partially neutralized polymer with the aqueous medium. Neutralization and dispersion can be accomplished in one step by combining the acid group-containing acrylic polymer and aqueous medium which contains the base. The polymer (or its salt) can be added to the aqueous medium or the aqueous medium added to the polymer (or its salt). The pH of the dispersion is preferably within the range of 7.0 to 9.0.

The neutralized or partially neutralized acid group-containing acrylic polymer serves as a dispersant for a subsequent polymerization of the dispersed phase of an alpha, beta-ethylenically unsaturated monomeric component which includes an epoxy group-containing monomer. The epoxy group-containing monomer should be present in amounts of about 1 to 7, preferably 1 to 5 percent by weight; the percentage by weight being based on total weight of the polymerizable monomers used in preparing the polymeric product. Amounts of less than one percent result in poor curing properties, whereas amounts greater than 7 percent present gelation problems. Also, to avoid gelation, the molar ratio of acid used to prepare the acrylic polymer dispersant to epoxy group-containing monomer should be at least 3 to 1 and preferably at least 4 to 1.

Examples of epoxy group-containing monomers which contain alpha, beta-ethylenic unsaturation are, for example, epoxy-containing vinyl monomers such as glycidyl acrylate and glycidyl methacrylate, which are preferred, and monomers such as allyl glycidyl ether, N-glycidyl acrylamide and vinyl cyclohexane monoepoxide.

Preferably, the epoxy group-containing monomer is used in combination with other alpha, beta-ethylenically unsaturated monomers to insure against gelation. Examples of other monomers are vinyl monomers such as those mentioned above in connection with the preparation of the acrylic polymer with the exception of those vinyl monomers which are reactive with epoxy functionality.

Typically, the epoxy group-containing monomer will constitute from about 2 to 50, preferably 5 to 25, and more preferably 5 to 10 percent by weight of the dispersed phase with the remainder being the other copolymerizable monomer; the percentages by weight being based on total weight of polymerizable monomers in the dispersed phase.

The alpha, beta-ethylenically unsaturated monomer component is dispersed in aqueous medium in the presence of the acrylic polymer dispersant and subjected to free radical polymerization conditions such as by heating in the presence of a free radical initiator until the free monomer content is reduced to below 1 and usually below 0.5 percent. The alpha, beta-ethylenically unsaturated monomer component is usually added (gradually if exotherming or foaming is a problem) to a preheated aqueous medium which contains the acrylic polymer dispersant. The time and temperature of polymerization will depend upon one another, the ingredients selected and the scale of the reaction. Usually polymerization will be between about 5 minutes to 3 hours at about 70° C. to 95° C.

Polymerization can be conducted in the presence of an oil-soluble free radical polymerization initiator and preferably in the presence of a chain transfer agent such as those mentioned above. Water-soluble free radical polymerization initiators such as peroxydisulfate and hydrogen peroxide are less desirable.

Preferred products are generally obtained from using from about 30 to 80, more preferably 40 to 75 percent by weight of the acrylic polymer dispersant and from about 70 to 20, preferably 60 to 25 percent by weight of the dispersed phase of the alpha, beta-ethylenically unsaturated monomer component; the percentages by weight being based on total weight of dispersant and dispersed phase.

For polymerization of the dispersed phase in the presence of the dispersant, the aqueous medium preferably should be present in amounts of about 20 to 90, more preferably 40 to 60 percent by weight based on total weight of dispersant and aqueous medium.

Besides water, the aqueous medium can contain some organic cosolvents. The organic cosolvents are preferably soluble or miscible with water. Examples of such solvents include oxygenated organic solvents such as monoalkylethers of ethylene glycol and diethylene glycol which contain from 1 to 4 carbon atoms in the alkyl group such as the monoethyl and monobutyl ethers of ethylene glycol and diethylene glycol. Examples of other water-soluble solvents include alcohols such as ethanol, isopropanol, butanol and diacetone alcohol. Preferably, the water-soluble oxygenated organic solvents should be present in amounts less than 25 percent and more preferably less than 20 percent by weight based on total weight of the aqueous medium. Use of amounts greater than 25 percent by weight increases the risk of a gelling in the second stage polymerization step.

Minor amounts, that is, less than 5 percent by weight based on total weight of the aqueous medium, of non-polar water-immiscible solvents such as aliphatic, cycloaliphatic and aromatic hydrocarbon such as hexane, cyclohexane and benzene may also be included in the aqueous medium.

As mentioned above, the polymeric products prepared in accordance with the process of the present invention form stable, curable, aqueous dispersions. By stable is meant the dispersions will not gel, flocculate nor precipitate at a temperature of 25° C. for at least 60 days. The aqueous dispersions are usually two-phase translucent aqueous-polymer systems in which the aqueous phase forms a continuous phase. By curable is meant that when the dispersions are applied to a substrate as a film and the water evaporated, the resultant film increases in hardness and organic solvent (e.g., acetone) resistance with the passage of time. The stability and curability of the dispersion is evidence that the polymeric products when dispersed in aqueous medium are non-crosslinked.

In practicing the process of the present invention, certain guidelines can be given to avoid gelling during the second stage polymerization.

The monomers used in preparing the acrylic polymer dispersant are selected so that the glass transition temperature ($T_g$) of the polymer is preferably above 0° C. $T_g$ can be calculated as described by Fox, *Bull. Am. Physics Soc.*, 1,3, page 123 (1956).

Also, the acid content and the quantity of base used in treating the polymer have an effect on the stability of the reaction mixture. Polymers with high acid contents requiring high amounts of base for dispersion present a gelation danger. The type of base also has an effect on gelation tendencies. Water-soluble amines, for example, hydroxyalkyl amines, are preferred.

However, even if the $T_g$ of the polymer is low and/or the acid content high, there are means which can be employed to promote stability. Water-soluble cosolvents should be present in the aqueous dispersion in amounts less than 15 percent by weight to insure non-gelling conditions, the percentage by weight being based on total weight of the aqueous medium. Also, the inclusion of about 1 to 5 percent by weight based on total weight of the aqueous medium of non-polar water-immiscible solvents such as aliphatic, cycloaliphatic and aromatic hydrocarbons is often helpful in preventing gelation.

As mentioned above, the aqueous dispersions of the present invention are useful in coating compositions. The aqueous dispersions of the polymeric products can be applied to substrates to form films and the water evaporated either at room temperature (20°-23° C.) or at elevated temperature, for example, 25°-250° C. Upon evaporation of the water, a curing or crosslinking reaction occurs as evidenced by the film becoming hard and solvent resistant. The cured coating will usually have a thickness of about 0.1 to 10 usually 0.5 to 5 mils depending on the solids content of the coating composition and on the method of applying the coating.

For coating applications, the resin solids content of the aqueous dispersions prepared in accordance with the present invention will vary somewhat depending upon the particular resinous materials employed. Resin solids contents of about 10 to 90, preferably 10 to 60 percent by weight in the aqueous medium are typical.

The coating compositions can be used to form clear coatings or optionally can be pigmented. The pigments may be any of the conventional type comprising, for example, iron oxides, lead oxides, strontium chromate, carbon black, coal dust, titanium dioxide, talc, barium sulfate, as well as color pigments such as cadmium yellow, cadmium red, chromium yellow, phthalocyanine blue, and the metallic pigments such as aluminum flake.

In addition to the above ingredients, various additives such as fillers, plasticizers, waxes, anti-oxidants, ultraviolet light absorbers, defoamers, fungicides, flow control agents, surfactants, and other formulating additives can optionally be employed if desired. These materials will generally constitute up to 20 percent by weight of the coating composition based on total solids.

Coating compositions of the invention can be applied to a variety of substrates such as wood, metal, glass, concrete, cloth, plastics, foams and the like, by a variety of application techniques, such as air spraying, airless spraying, electrostatic spraying, electrodeposition, dipping, brushing, rolling, roller coating and the like.

The following examples illustrate the invention. All quantities are on a weight basis unless otherwise indicated.

EXAMPLE I

Preparation of Polymeric Dispersant

An acrylic polymer dispersant was prepared as follows:

| Feed A | |
|---|---|
| Ingredients | Parts by Weight |
| methyl methacrylate | 1179.1 |
| methacrylic acid | 75.3 |
| t-dodecyl mercaptan | 25.1 |

| Feed B | |
|---|---|
| Ingredients | Parts by Weight |
| 2-ethoxyethanol | 187.5 |
| VAZO 52[1] | 18.75 |

[1]Azobisisovaleronitrile commercially available from E.I. duPont de Nemours and Company.

| Feed C | |
|---|---|
| Ingredients | Parts by Weight |
| 2-ethoxyethanol | 22.4 |
| t-butyl perbenzoate | 5.6 |

| Feed D | |
|---|---|
| dimethylethanolamine | 62.3 (80% TN) |

[2] Percentage of total theoretical neutralization.

| Feed E | |
|---|---|
| deionized water | 2026 |

An initial charge comprising 238.3 parts of 2-ethoxyethanol and 10 percent each of Feed A and Feed B was heated in a reaction flask under a nitrogen atmosphere to reflux. The remaining portions of Feed A and Feed B were added simultaneously with agitation to the reaction mixture over the period of about three hours while maintaining the reaction at reflux. At the completion of these additions, Feed C was added to the reaction mixture at reflux over a period of about two hours, and the reaction mixture held at reflux for about one hour followed by the addition of Feed D and Feed E to form the polymeric dispersant in aqueous medium. The dispersion had an acid value of 14.5, a pH of 8.2, a solids content of 36.7 percent and a Brookfield viscosity of 1300 centipoises measured at 23° C. with a No. 6 spindle at 50 rpm's.

Preparation of Aqueous Dispersion

Methyl methacrylate and glycidyl methacrylate were dispersed and polymerized in the presence of the above-described polymeric dispersant as follows:

| Kettle Charge | |
|---|---|
| Ingredients | Parts by Weight |
| aqueous polymeric dispersant prepared as described above | 3264.0 |
| deionized water | 205.7 |

| Feed F | |
|---|---|
| Ingredients | Parts by Weight |
| methyl methacrylate | 722.2 |
| glycidyl methacrylate | 39.8 |
| VAZO 52 | 7.6 |

| Feed G | |
|---|---|
| triethylamine | 32.2 |

The kettle charge was heated in a reaction kettle to 85° C. followed by rapid addition of Feed F with agitation. The reaction mixture started to exotherm at 88° C., was cooled and held for 15 minutes at 80°-85° C. to complete polymerization. The reaction mixture was cooled to 30° C. followed by the addition of Feed G. The resultant polymeric product was ungelled and dispersed in aqueous medium. The dispersion had a pH of 8.9, a solids content of 42.23 percent and a Brookfield viscosity of 340 centipoises measured at 23° C. with a No. 2 spindle at 20 rpm's.

The dispersion was applied as a film to wood substrates by drawing down with a 3-mil drawbar. After curing at 140° F. (60° C.) for 10 minutes, the film had a thickness of about 0.3 mil, a pencil hardness of 2H, and had an acetate resistance of 70 double rubs. The pencil hardness is determined by taking a series of sharpened pencils of varying hardness with H being the hardest and B the softest and scratching the coated substrates with pencils of increasing hardness until the coating is etched from the substrate. The higher the numbers before the letter H, the harder the pencil, for example, 2H is harder than H. The acetone resistance is measured by rubbing the coated substrate with an acetone-saturated cloth, using double rubs, with normal hand pressure until the coating is removed from the substrate.

When the freshly applied film was air dried at room temperature (20°-23° C.) for 5 days, 100 acetone double rubs did not remove the film from the substrate.

For the purpose of comparison, a similar dispersion, but one which was prepared using all methyl methacrylate instead of a glycidyl methacrylate-methyl methacrylate mixture in the second stage polymerization, was prepared and applied as a film to a wood substrate as generally described above. After curing at 140° F. (60° C.) for 10 minutes, the film had a pencil hardness of H and 30 acetone double rubs removed the film from the substrate. When air dried for 5 days at room temperature, 30 acetone double rubs removed the film from the substrate.

EXAMPLE II

Preparation of Polymeric Dispersant

An acrylic polymer dispersant was prepared as follows:

| Feed A | |
|---|---|
| Ingredients | Parts by Weight |
| methyl methacrylate | 1052 |
| methacrylic acid | 67.2 |
| VAZO 64[1] | 16.8 |
| tertiary-dodecyl mercaptan | 11.2 |

[1] Azobisisobutyronitrile commercially available from E. I. duPont de Nemours and Company.

| Feed B | |
|---|---|
| Ingredients | Parts by Weight |
| 2-ethoxyethanol | 20 |
| t-butyl perbenzoate | 4.96 |

| Feed C | |
|---|---|
| dimethylethanolamine | 34.8 (50% TN) |

| Feed D | |
|---|---|
| deionized water | 1808 |

An initial charge of 400 parts of 2-ethoxyethanol was heated in a reaction flask under a nitrogen atmosphere to reflux at 124° C. The nitrogen flow was stopped and Feed A was started and continued over a period of three hours with the temperature being maintained at reflux. At the completion of Feed A, Feed B was started and continued for two hours at reflux. The reaction mixture was held for one hour at reflux (134° C.), cooled to 100° C. and the dimethylethanolamine and deionized water added to form the polymeric dispersant in aqueous medium. The dispersion had a resin solids content of 31.9 percent.

Preparation of Aqueous Dispersion

Glycidyl methacrylate and methyl methacrylate were dispersed and polymerized in the presence of the above-described polymeric dispersant as follows:

| Kettle Charge | |
|---|---|
| Ingredients | Parts by Weight |
| aqueous polymeric dispersant prepared as described above | 2548.0 |
| deionized water | 488.8 |

| Feed E | |
|---|---|
| Ingredients | Parts by Weight |
| methyl methacrylate | 239.6 |
| glycidyl methacrylate | 32 |
| VAZO | 2.7 |

| Feed F | |
|---|---|
| triethylamine | 29.6 |

The kettle charge was agitated under a nitrogen atmosphere at a temperature of 25° C. and Feeds E and F were initiated and fed simultaneously to the reaction kettle. After the addition had been completed, the reaction mixture was heated to 80°-85° C. and held for one hour to complete the polymerization. The reaction mixture was then cooled to room temperature. The resultant polymeric product was ungelled and dispersed in aqueous medium. The dispersion had a pH of 8.8, a total solids content of 34.2 percent and a Brookfield viscosity of 36 centipoises as measured at 23° C. with a No. 1 spindle at 50 rpm's.

When the dispersion was applied as a film to wood substrates as described in Example I, the film had the following acetone resistance and hardness:

| Cure Conditions | Acetone Resistance (Double Rubs) | Pencil Hardness |
|---|---|---|
| 60° C./10 minutes | 70 | 2H |
| 20-23° C./5 days | >100 | |

For the purpose of comparison, a similar dispersion but one which was prepared using all methyl methacrylate instead of a glycidyl methacrylatemethyl methacrylate mixture in the second stage polymerization was prepared and applied as a film to a wood substrate as generally described above. The acetone resistance and hardness of the film was as follows:

| Cure Conditions | Acetone Resistance (Double Rubs) | Pencil Hardness |
|---|---|---|
| 60° C./10 minutes | 33 | H |
| 20-23° C./5 days | 33 | |

EXAMPLE III

The acrylic polymer dispersant of Example I was used as the medium for polymerizing glycidyl methacrylate and methyl methacrylate as follows:

| Kettle Charge | |
|---|---|
| acrylic polymer dispersant of Example I | 2719.5 |

| Feed A | |
|---|---|
| VAZO 52 | 6.5 |

| Feed B | |
|---|---|
| Ingredients | Parts by Weight |
| aqueous acrylic polymer dispersant of Example I | 71.25 |
| deionized water | 175.9 |
| methyl methacrylate | 617.5 |
| glycidyl methacrylate | 34 |

| Feed C | |
|---|---|
| triethylamine | 27.6 |

The kettle charge was heated in a reaction kettle under a nitrogen atmosphere with agitation to 80° C. followed by the addition of Feed A. Feed B was started and continued over a period of about three hours with the temperature reaching 86° C. The reaction mixture was held for one hour between 86°-90° C. to complete the polymerization. The reaction mixture was cooled to 35° C. followed by the addition of Feed C. The resulting polymeric product was ungelled and dispersed in aqueous medium. The dispersion had a pH of 9.4, a total solids content of 42.8 percent and a Brookfield viscosity of 144 centipoises measured at 23° C. with a No. 2 spindle at 50 rpm's.

When the dispersion was applied as a film to wood substrates as described in Example I, the film had the following acetone resistance and hardness:

| Cure Conditions | Acetone Resistance (Double Rubs) | Pencil Hardness |
|---|---|---|
| 60° C./10 minutes | 60 | 3H |
| 20-23° C./5 days | >100 | |

For the purpose of comparison, a similar dispersion but one which was prepared using all methyl methacrylate instead of the glycidyl methacrylatemethyl methacrylate mixture in the second stage polymerization was prepared and applied as a film to a wood substrate as generally described above. The acetone resistance and hardness of the film was as follows:

| Cure Conditions | Acetone Resistance (Double Rubs) | Pencil Hardness |
|---|---|---|
| 60° C./10 minutes | 30 | H |
| 20-23° C./5 days | 30 | |

EXAMPLE IV

Preparation of Polymeric Dispersant

An acrylic polymer dispersant was prepared as follows:

| Kettle Charge | |
|---|---|
| 2-ethoxyethanol | 929.4 |

| Feed A | |
|---|---|
| Ingredients | Parts by Weight |
| methyl methacrylate | 1664.0 |
| butyl acrylate | 780.0 |
| methacrylic acid | 156 |
| VAZO 52 | 39.0 |
| t-dodecyl mercaptan | 26.0 |

| Feed B | |
|---|---|
| Ingredients | Parts by Weight |
| 2-ethoxyethanol | 46.5 |
| VAZO 52 | 11.4 |

| Feed C | |
|---|---|
| dimethylethanolamine | 129.0 (80% TN) |

| Feed D | |
|---|---|
| deionized water | 4201.3 |

The kettle charge was heated under a nitrogen atmosphere to reflux at 126° C. and the nitrogen removed. Feed A was added continuously to the reaction kettle over the period of about 3 hours with the temperature of the reaction mixture being maintained at reflux. At the completion of Feed A, Feed B was started and continued for 2 hours at reflux. The reaction mixture was held for one hour at reflux (136° C.), cooled to 100° C. followed by the addition of Feed C and Feed D to form the polymeric dispersant in aqueous medium. The dispersion had a total solids content of 35.2 percent and an acid value of 14.05.

Preparation of Aqueous Dispersion

Glycidyl methacrylate and methyl methacrylate were dispersed and polymerized in the presence of the above-described polymeric dispersant as follows:

| Kettle Charge | |
|---|---|
| Ingredients | Parts by Weight |
| aqueous polymeric dispersant prepared as described above | 5500 |

| Kettle Charge | |
|---|---|
| Ingredients | Parts by Weight |
| deionized water | 344.3 |

| Feed E | |
|---|---|
| Ingredients | Parts by Weight |
| methyl methacrylate | 1208.4 |
| glycidyl methacrylate | 66.6 |
| VAZO 52 | 12.65 |

| Feed F | |
|---|---|
| triethylamine | 26.95 |

The kettle charge was heated with agitation under a nitrogen atmosphere to 80° C. Feed E was added to the reaction kettle and the reaction mixture maintained at 80° C. which resulted in an exotherm. The nitrogen sparging was removed, and the exotherm continued for 25 minutes at a temperature of about 85° C. At the end of the exotherm, the reaction mixture was held for one hour at 83° C. to complete the polymerization. The reaction mixture was cooled to 45° C., followed by the addition of the triethylamine. The resultant polymeric product was ungelled and dispersed in aqueous medium. The dispersion had a total solids content of 41.95 percent, a pH of 9.1, a Brookfield viscosity of 360 centipoises measured at 23° C. with a No. 2 spindle at 20 rpm's.

EXAMPLE V

Preparation of Polymeric Dispersant

An acrylic polymer dispersant was prepared as follows:

| Kettle Charge | |
|---|---|
| 2-ethoxyethanol | 929.4 |

| Feed A | |
|---|---|
| Ingredients | Parts by Weight |
| methyl methacrylate | 1404.0 |
| butyl acrylate | 1040.0 |
| methacrylic acid | 156.0 |
| VAZO 52 | 39.0 |
| t-dodecyl mercaptan | 26.0 |

| Feed B | |
|---|---|
| Ingredients | Parts by Weight |
| 2-ethoxyethanol | 46.5 |
| VAZO 52 | 11.4 |

| Feed C | |
|---|---|
| dimethylethanolamine | 129.0 |

| Feed D | |
|---|---|
| deionized water | 4201.3 |

The first portion of 2-ethoxyethanol was charged to a reaction vessel and heated under a nitrogen atmosphere at reflux at 126° C. Feed A was added continuously over the period of 3 hours at reflux conditions. At the completion of Feed A, Feed B was started and continued for 2 hours at reflux. The reaction mixture was held at reflux (138° C.) for about one hour followed by cooling to 100° C. and the addition of Feed C and Feed D to form the polymeric dispersant in aqueous medium. The dispersion had a solids content of 34.38 percent.

Preparation of Aqueous Dispersion

Methyl methacrylate and glycidyl methacrylate were polymerized in the presence of the above-described polymeric dispersant as follows:

| Kettle Charge | |
|---|---|
| Ingredients | Parts by Weight |
| aqueous polymeric dispersant prepared as described above | 5500 |
| deionized water | 343.3 |

| Feed E | |
|---|---|
| Ingredients | Parts by Weight |
| methyl methacrylate | 1208.4 |
| glycidyl methacrylate | 66.6 |
| VAZO 52 | 12.65 |

| Feed F | |
|---|---|
| triethylamine | 26.95 |

The kettle charge was heated in a reaction kettle under a nitrogen atmosphere to 80° C. Feed E was added and the temperature lowered to 50° C. The reaction mixture was then heated to 80° C. where it began to exotherm. The exotherm was continued for about 20 minutes with the highest temperature reaching 85° C. The exotherm subsided and the reaction mixture was held at 84° C. for one hour to complete the polymerization. The reaction mixture was cooled to 45° C. followed by the addition of Feed F. The resultant polymeric product was ungelled and dispersed in aqueous medium. The dispersion had a solids content of 41.69 percent, a pH of 8.9, and a Brookfield viscosity of 1550 centipoises measured at 23° C. with a No. 2 spindle at 20 rpm's.

EXAMPLE VI

Preparation of Polymeric Dispersant

An acrylic polymer dispersant was prepared as follows:

| Kettle Charge | |
|---|---|
| Ingredients | Parts by Weight |
| 2-ethoxyethanol | 572.0 |
| 10% Feed A | 307.0 |
| 10% Feed B | 49.5 |

| Feed A | |
|---|---|
| Ingredients | Parts by Weight |
| methyl methacrylate | 2227.8 |
| 2-ethylhexyl acrylate | 602.1 |
| methacrylic acid | 180.75 |
| t-dodecyl mercaptan | 60.25 |

| Feed B | |
|---|---|
| Ingredients | Parts by Weight |
| 2-ethoxyethanol | 450.0 |
| VAZO 52 | 45.0 |

| Feed C | |
|---|---|
| Ingredients | Parts by Weight |
| 2-ethoxyethanol | 53.75 |
| t-butyl perbenzoate | 13.3 |

| Feed D | |
|---|---|
| dimethylethanolamine | 149.5 (80% TN) |

| Feed E | |
|---|---|
| deionized water | 4862.5 |

The kettle charge was heated in a reaction kettle with agitation to reflux at 125° C. Feed A and Feed B were added simultaneously and continuously over 3 hours under reflux conditions. At the completion of Feeds A and B, Feed C was started and continued over 2 hours at reflux. The reaction mixture was held for one hour at reflux (138° C.) followed by cooling to 87° C. and the addition of Feed D and Feed E to form the polymeric dispersant in aqueous medium. The dispersion had an acid value of 14.56, a pH of 8.2, a total solids content of 36.15 percent and a Brookfield viscosity of 1680 centipoises measured at 23° C. with a No. 5 spindle at 50 rpm's.

Preparation of Aqueous Dispersion

Methyl methacrylate, 2-ethylhexyl acrylate and glycidyl methalcrylate were polymerized in the presence of the above-described polymeric dispersant as follows:

| Kettle Charge | |
|---|---|
| Ingredients | Parts by Weight |
| aqueous polymeric dispersant prepared as described above | 2400 |
| deionized water | 372 |

| Feed F | |
|---|---|
| Ingredients | Parts by Weight |
| methyl methacrylate | 375.4 |
| 2-ethylhexyl acrylate | 125.2 |
| glycidyl methacrylate | 27.4 |
| VAZO 52 | 5.3 |

The kettle charge was heated in a reaction kettle with agitation to 50° C. followed by the addition of Feed F. The temperature of the reaction mixture was raised to about 80°-85° C. over a period of about 15 minutes and held at this temperature for 15 minutes to complete the polymerization, followed by cooling to room temperature. The resultant polymeric product was ungelled and dispersed in aqueous medium. The dispersion had a solids content of 39.3 percent, a pH of 8.5 and a Brookfield viscosity of 88 centipoises measured at 23° C. with a No. 2 spindle at 50 rpm's.

EXAMPLE VII

An acrylic polymer dispersant was prepared followed by the polymerization of methyl methacrylate and glycidyl methacrylate in the presence of the polymeric dispersant as follows:

| Kettle Charge | |
|---|---|
| 2-ethoxyethanol | 834.4 |

| Feed A | |
|---|---|
| Ingredients | Parts by Weight |
| 2-ethoxyethanol | 600.0 |
| VAZO 52 | 60.2 |

| Feed B | |
|---|---|
| Ingredients | Parts by Weight |
| methyl methacrylate | 2568.8 |
| butyl acrylate | 1204.1 |
| methacrylic acid | 241.0 |
| t-dodecyl mercaptan | 40.2 |

| Feed C | |
|---|---|
| Ingredients | Parts by Weight |
| 2-ethoxyethanol | 71.7 |
| t-butyl perbenzoate | 17.0 |

| Feed D | |
|---|---|
| dimethylethanolamine | 199.3 (80% TN) |

| Feed E | |
|---|---|
| deionized water | 6483.3 |

| Feed F | |
|---|---|
| deionized water | 776.2 |

| Feed G | |
|---|---|
| Ingredients | Parts by Weight |
| methyl methacrylate | 2724.7 |
| glycidyl methacrylate | 150.1 |
| VAZO 52 | 28.8 |

| Feed H | |
|---|---|
| triethylamine | 121.4 |

The kettle charge was heated in a reaction kettle under a nitrogen atmosphere to reflux at 125° C. The nitrogen sparging was stopped and Feeds A and B were simultaneously started. Feed A was completed in 15 minutes and Feed B was completed in 3 hours. At the completion of Feed B, Feed C was started and continued for two hours under reflux conditions. At the completion of Feed C, the reaction mixture was held for one hour at reflux (138° C.), cooled to 100° C., followed by the addition of Feeds D and E to form the polymeric dispersant in aqueous medium. This dispersion was stirred overnight.

Feed F was added to the dispersion followed by heating under a nitrogen atmosphere to 50° C. Feed G was added and the reaction mixture heated slowly to 61° C. with an exotherm being noticed and the temperature being raised over the period of about 15 minutes to 79° C. The reaction mixture was cooled to 73° C. followed by the addition of the triethylamine. The resultant polymeric product was ungelled and dispersed in aqueous medium. The dispersion had a solids content of 41.33 percent, a pH of 9.1, and a Brookfield viscosity of 3950 centipoises measured at 23° C. with a No. 3 spindle at 20 rpm's.

EXAMPLE VIII

Preparation of Polymeric Dispersant

An acrylic polymer dispersant was prepared as follows:

| Kettle Charge | |
|---|---|
| 2-ethoxyethanol | 400 |

| Feed A | |
|---|---|
| Ingredients | Parts by Weight |
| methyl methacrylate | 783.4 |
| stearyl methacrylate | 268.6 |
| methacrylic acid | 67.2 |
| t-dodecyl mercaptan | 11.2 |
| t-butyl peracetate | 33.6 |

| Feed B | |
|---|---|
| Ingredients | Parts by Weight |
| 2-ethoxyethanol | 20 |

-continued

| Feed B | |
|---|---|
| Ingredients | Parts by Weight |
| t-butyl peracetate | 10 |

| Feed C | |
|---|---|
| dimethylethanolamine | 55.7 (80% TN) |

| Feed D | |
|---|---|
| deionized water | 1808.0 |

The kettle charge was heated in a reaction kettle with agitation to reflux at 132° C. Feed A was started and continued over the period of about 3 hours followed by the starting of Feed B which was continued over the period of 2 hours with the temperature being maintained at reflux. At the completion of Feed B, the reaction mixture was held for 2 hours at reflux (133° C.), cooled to 85° C., followed by the addition of Feed C and Feed D to form the polymeric dispersant in aqueous medium.

Preparation of Aqueous Dispersion

Glycidyl methacrylate and methyl methacrylate were polymerized in the presence of the above-described polymeric dispersant as follows:

| Kettle Charge | |
|---|---|
| Ingredients | Parts by Weight |
| aqueous polymeric dispersant prepared as described above | 3457.7 |
| deionized water | 663.3 |

| Feed E | |
|---|---|
| Ingredients | Parts by Weight |
| methyl methacrylate | 325.1 |
| glycidyl methacrylate | 43.4 |
| VAZO | 3.66 |

| Feed F | |
|---|---|
| triethylamine | 40.2 |

The kettle charge was heated in a reaction kettle with agitation under a nitrogen atmosphere to 80°-85° C. followed by the addition of Feeds E and F and holding for one hour at a temperature of 80°-81° C. to complete the polymerization. The resultant polymeric product was ungelled and dispersed in aqueous medium. The dispersion had a solids content of 34.7 percent, a pH of 8.9, and a Brookfield viscosity of 3000 centipoises measured at 23° C. with a No. 4 spindle at 20 rpm's.

EXAMPLE IX

Preparation of Polymeric Dispersant

An acrylic polymer dispersant was prepared as follows:

| Kettle Charge | |
|---|---|
| Ingredients | Parts by Weight |
| 2-ethoxyethanol | 46.3 |
| 20% Feed A | 262.8 |

| | 19 Feed A |
|---|---|
| Ingredients | Parts by Weight |
| methyl methacrylate | 608.5 |
| butyl acrylate | 608.5 |
| methacrylic acid | 77.7 |
| VAZO 52 | 19.4 |
| t-dodecyl mercaptan | 38.8 |

| Feed B | |
|---|---|
| Ingredients | Parts by Weight |
| 2-ethoxyethanol | 23.1 |
| t-butyl perbenzoate | 5.7 |

| Feed C | |
|---|---|
| dimethylethanolamine | 60.3 (75% TN) |

| Feed D | |
|---|---|
| deionized water | 2091.4 |

The kettle charge was heated in a reaction kettle under a nitrogen atmosphere to exotherm at 120° C. The nitrogen was shut off and Feed A started and continued over the period of 3 hours under reflux conditions. At the completion of Feed A, Feed B was begun and continued for 2 hours under reflux conditions. The reaction mixture was cooled to 100° C. followed by the additions of Feeds C and D to form the polymeric dispersant in aqueous medium. The dispersion had an acid value of 18.1, a solids content of 36.12 percent, a pH of 8.7, and a viscosity of 1730 centipoises measured at 23° C. with a No. 2 spindle at 20 rpm's.

Preparation of Aqueous Dispersion

Methyl methacrylate, butyl acrylate and glycidyl methacrylate were polymerized in the presence of the above-described polymeric dispersant as follows:

| Kettle Charge | |
|---|---|
| Ingredients | Parts by Weight |
| aqueous polymeric dispersant prepared as described above | 810.8 |
| deionized water | 89.2 |

| Feed E | |
|---|---|
| Ingredients | Parts by Weight |
| methyl methacrylate | 44.8 |
| butyl acrylate | 44.8 |
| glycidyl methacrylate | 10.4 |
| VAZO 52 | 1.0 |
| t-dodecyl mercaptan | 1.0 |

The kettle charge was heated in a reaction kettle to a temperature of 50° C. followed by the addition of Feed E. The temperature was raised to 83° C. over the period of about 15 minutes and the temperature held for one hour at 80°–85° C. to complete the polymerization. The resultant polymeric product was ungelled and dispersed in aqueous medium. The dispersion had a solids content of 35 percent, a pH of 8.7, and a Brookfield viscosity of 96 centipoises measured at 23° C. with a No. 2 spindle at 50 rpm's.

EXAMPLE X preparation of Polymeric Dispersant

An acrylic polymer dispersant was prepared as follows:

| Kettle Charge | |
|---|---|
| 2-ethoxyethanol | 1160.0 |

| Feed A | |
|---|---|
| Ingredients | Parts by Weight |
| methyl methacrylate | 2271.9 |
| isodecyl methacrylate | 778.9 |
| methacrylic acid | 194.9 |
| t-dodecyl mercaptan | 32.5 |
| VAZO 52 | 48.7 |

| Feed B | |
|---|---|
| Ingredients | Parts by Weight |
| 2-ethoxyethanol | 130.5 |
| VAZO 52 | 14.5 |

| Feed C | |
|---|---|
| dimethylethanolamine | 161.0 (80% TN) |

| Feed D | |
|---|---|
| deionized water | 6201.0 |

The kettle charge was heated in a reaction kettle under a nitrogen atmosphere to reflux at 130° C. The nitrogen source was shut off and Feed A was started and continued over the period of 3 hours at reflux temperature. At the completion of Feed A, Feed B was started and continued over the period of 2 hours at reflux temperature. The reaction mixture was held for about one hour at reflux (128° C.) followed by cooling to 100° C. and the addition of Feeds C and D to form the polymeric dispersant in aqueous medium. The dispersion had a solids content of 30.44 percent, an acid value of 13.8, a pH of 8.3 and a Brookfield viscosity of 130 centipoises measured at 23° C. with a No. 1 spindle at 20 rpm's.

Preparation of Aqueous Dispersion

Methyl methacrylate and glycidyl methacrylate were polymerized in the presence of the above-described polymeric dispersant as follows:

| Kettle Charge | |
|---|---|
| Ingredients | Parts by Weight |
| aqueous polymeric dispersant prepared as described above | 6340.0 |
| deionized water | 558.4 |

| Feed E | |
|---|---|
| Ingredients | Parts by Weight |
| methyl methacrylate | 545.0 |
| glycidyl methacrylate | 72.8 |
| VAZO 52 | 6.14 |

| Feed F | |
|---|---|
| triethylamine | 67.4 |

The kettle charge was heated in a reaction kettle to 52° C. followed by the addition of Feed E. The reaction mixture was heated slowly to 80° C. and held for one hour at 80° C. to complete the polymerization, followed by cooling to 30° C. and the addition of Feed F. The resultant polymeric product was ungelled and dispersed in aqueous medium. The dispersion had a solids content of 32.52 percent, a pH of 9.5 and a Brookfield viscosity of 45 centipoises measured with a No. 1 spindle at 23° C. and 20 rpm's.

EXAMPLE XI

Preparation of Polymeric Dispersant

An acrylic polymer dispersant was prepared as follows:

| Kettle Charge | |
|---|---|
| 2-ethoxyethanol | 394.4 |

| Feed A | |
|---|---|
| Ingredients | Parts by Weight |
| methyl methacrylate | 717.3 |
| isodecyl methacrylate | 264.8 |
| hydroxypropyl methacrylate | 58.8 |
| methacrylic acid | 66.3 |
| t-dodecyl mercaptan | 33.1 |
| VAZO 52 | 16.6 |

| Feed B | |
|---|---|
| Ingredients | Parts by Weight |
| 2-ethoxyethanol | 44.4 |
| VAZO 52 | 4.93 |

| Feed C | |
|---|---|
| dimethylethanolamine | 54.7 (80% TN) |

| Feed D | |
|---|---|
| deionized water | 2108.3 |

The kettle charge was heated in a reaction kettle under a nitrogen atmosphere to reflux at 132° C. Feed A was started and continued over the period of 3 hours at reflux temperature. At the completion of Feed A, Feed B was started and continued over the period of 2 hours at reflux temperature. The reaction mixture was held for one hour at reflux (137° C.) followed by cooling to below 100° C. and the addition of Feeds C and D to form the polymeric dispersant in aqueous medium. The dispersion had an acid value of 14.7, a solids content of 32.1 percent, a pH of 8.25, and a Brookfield viscosity of 130 centipoises as measured at 23° C. with a No. 1 spindle at 20 rpm's.

Preparation of Aqueous Dispersion

Methyl methacrylate, isodecyl methacrylate, glycidyl methacrylate and hydroxypropyl methacrylate were polymerized in the presence of the above-described polymeric dispersant as follows:

| Kettle Charge | |
|---|---|
| Ingredients | Parts by Weight |
| aqueous polymeric dispersant prepared as described above | 1014.4 |
| deionized water | 89.3 |

| Feed E | |
|---|---|
| Ingredients | Parts by Weight |
| methyl methacrylate | 57.6 |
| isodecyl methacrylate | 24.7 |
| glycidyl methacrylate | 11.7 |
| hydroxypropyl methacrylate | 4.9 |
| VAZO 52 | 1.0 |
| t-dodecyl mercaptan | 1.0 |

The kettle charge was heated in a reaction kettle to 50° C. followed by the addition of Feed E and heating to 85°-90° C. The reaction mixture was held for one hour at 90° C. to complete the polymerization. The resultant polymeric product was ungelled and dispersed in aqueous medium. The dispersion had a solids content of 31.5 percent, a pH of 8.9, and a Brookfield viscosity of 40 centipoises measured at 23° C. with a No. 1 spindle at 50 rpm's.

EXAMPLE XII

Preparation of Polymeric Dispersant

An acrylic polymer dispersant was prepared as follows:

| Kettle Charge | |
|---|---|
| Ingredients | Parts by Weight |
| 2-ethoxyethanol | 572 |
| 10% Feed A | 307 |
| 10% Feed B | 49.5 |

| Feed A | |
|---|---|
| Ingredients | Parts by Weight |
| methyl methacrylate | 1354.5 |
| styrene | 1354.5 |
| methacrylic acid | 240.8 |
| t-dodecyl mercaptan | 60.3 |

| Feed B | |
|---|---|
| Ingredients | Parts by Weight |
| 2-ethoxyethanol | 450 |
| VAZO 52 | 45 |

| Feed C | |
|---|---|
| Ingredients | Parts by Weight |
| 2-ethoxyethanol | 53.75 |
| t-butyl perbenzoate | 13.35 |

| Feed D | |
|---|---|
| dimethylethanolamine | 199.5 (80% TN) |

| Feed E | |
|---|---|
| deionized water | 4862.5 |

The kettle charge was heated in a reaction kettle with agitation to reflux at 125° C. Feeds A and B were started simultaneously and continued over a 3-hour period with the temperature being maintained at reflux. At the completion of the addition of Feeds A and B, Feed C was started and continued over a 2-hour period at reflux temperature. The reaction mixture was held for one hour at reflux (137° C.), cooled to 105° C. followed by the addition of Feed D, cooling to 70° C., followed by the addition of Feed E and then thinning with an additional 1000 parts by weight of deionized water to form the polymeric dispersant in aqueous medium. The dispersion had a solids content of 29 percent, a pH of 9.2, and a Brookfield viscosity of 1120 centipoises measured at 23° C. with a No. 4 spindle at 50 rpm's.

Preparation of Aqueous Dispersion

Methyl methacrylate and glycidyl methacrylate were polymerized in the presence of the above-described polymeric dispersant as follows:

| Kettle Charge | |
|---|---|
| Ingredients | Parts by Weight |
| aqueous polymeric dispersant prepared as described above | 2896.6 |
| deionized water | 43.4 |

| Feed F | |
|---|---|
| Ingredients | Parts by Weight |
| methyl methacrylate | 511.35 |

-continued

Feed F

| Ingredients | Parts by Weight |
| --- | --- |
| glycidyl methacrylate | 48.65 |
| VAZO 52 | 5.6 |

The kettle charge was heated in a reaction kettle to 80° C. followed by the addition of Feed F with agitation. The temperature was maintained between 86°-89° C. for about 10 minutes followed by cooling to 80° C. and maintaining at this temperature for 15 minutes. The mixture then suddenly exothermed reaching a temperature of 93° C. The reaction was cooled and filtered. The polymeric product was ungelled and dispersed in aqueous medium. The dispersion had a solids content of 39.8 percent and a Brookfield viscosity of 15 centipoises measured at 23° C. with a No. 1 spindle at 50 rpm's.

We claim:

1. A stable, curable, aqueous dispersion of a polymeric product which is prepared by polymerizing in aqueous medium under free radical polymerization conditions:
    (1) a dispersed phase of a polymerizable alpha, beta-ethylenically unsaturated monomer component which includes 1 to 7 percent by weight of an epoxy group-containing monomer; the percentage by weight being based on total weight of monomers used in preparing the polymeric product, in the presence of
    (2) an at least partially base neutralized acid group-containing acrylic polymer dispersant; the molar ratio of acid used in preparing the acrylic polymer to epoxy group-containing monomer being at least 3/1.

2. The dispersion of claim 1 in which the acrylic polymer dispersant is prepared from polymerizing a mixture of vinyl monomers which includes an alpha, beta-ethylenically unsaturated carboxylic acid selected from the class consisting of acrylic acid, methacrylic acid and mixtures thereof.

3. The dispersion of claim 2 in which the mixture of vinyl monomers further includes a member selected from the class consisting of styrene, a lower alkyl ester of methacrylic acid containing from 1 to 3 carbon atoms in the alkyl group and mixtures thereof.

4. The dispersion of claim 3 in which the lower alkyl ester of methacrylic acid is methyl methacrylate.

5. The dispersion of claim 1 in which the dispersed phase is a mixture of vinyl monomers which includes 2 to 50 percent by weight glycidyl acrylate or glycidyl methacrylate, and percentage by weight based on total weight of polymerizable monomers in the dispersed phase.

6. The dispersion of claim 5 in which the mixture of vinyl monomers further includes a member selected from the class consisting of styrene, lower alkyl ester of methacrylic acid containing from 1 to 3 carbon atoms in the alkyl group and mixtures thereof.

7. The dispersion of claim 6 in which the lower alkyl ester of methacrylic acid is methyl methacrylate.

8. The dispersion of claim 1 in which the base is an amine.

9. The dispersion of claim 1 in which the aqueous medium is present in amounts of about 20 to 90 percent by weight based on total weight of dispersed phase, acrylic polymer dispersant and aqueous medium.

10. The dispersion of claim 9 in which the aqueous medium contains an oxygenated organic solvent which is present in amounts less than about 20 percent by weight based on total weight of the aqueous medium.

11. The dispersion of claim 10 in which the organic solvent is a monoalkyl ether of ethylene glycol or diethylene glycol containing from 1 to 4 carbon atoms in the alkyl group.

12. The dispersion of claim 1 in which the polymerization is conducted in the presence of a free radical polymerization initiator which is soluble in the polymerizable alpha, beta-ethylenically unsaturated monomer component.

13. The dispersion of claim 1 in which the polymerization is conducted in the presence of a chain transfer agent which is soluble in the alpha, beta-ethylenically unsaturated monomer component.

14. The dispersion of claim 12 in which the free radical polymerization initiator is selected from the class consisting of peroxides, azo compounds and diazo compounds.

15. The dispersion of claim 13 in which the chain transfer agent is tertiary-dodecyl mercaptan.

16. A process for preparing ungelled, curable, polymeric products which comprises:
    (1) dispersing in aqueous medium, in the presence of an at least partially base neutralized acid group-containing acrylic polymer dispersant, an alpha, beta-ethylenically unsaturated monomer component which includes 1 to 7 percent by weight of an epoxy group-containing monomer; the percentage by weight being based on total weight of the monomers used in preparing the polymeric product; the molar ratio of acid used in preparing the acrylic polymer dispersant to epoxy group-containing monomer being at least 3/1;
    (2) subjecting said dispersion to free radical polymerization conditions to form the polymeric product dispersed in aqueous medium in a stable condition.

17. The process of claim 16 in which the acrylic polymer dispersant is prepared from polymerizing a mixture of vinyl monomers which includes an alpha, beta-ethylenically unsaturated carboxylic acid selected from the class consisting of acrylic acid, methacrylic acid and mixtures thereof.

18. The process of claim 17 in which the mixture of vinyl monomers further includes a member selected from the class consisting of styrene, a lower alkyl ester of methacrylic acid containing from 1 to 3 carbon atoms in the alkyl group and mixtures thereof.

19. The process of claim 18 in which the lower alkyl ester of methacrylic acid is methyl methacrylate.

20. The process of claim 16 in which the dispersed phase is a mixture of vinyl monomers which includes 2 to 50 percent by weight glycidyl acrylate or glycidyl methacrylate, the percentage by weight being based on total weight of polymerizable monomers in the dispersed phase.

21. The process of claim 20 in which the mixture of vinyl monomers further includes a member selected from the class consisting of styrene, lower alkyl ester of methacrylic acid containing from 1 to 3 carbon atoms in the alkyl group and mixtures thereof.

22. The process of claim 21 in which the lower alkyl ester of methacrylic acid is methyl methacrylate.

23. The process of claim 16 in which the base is an amine.

24. The process of claim 16 in which the aqueous medium is present in amounts of about 20 to 90 percent by weight based on total weight of dispersed phase, acrylic polymer dispersant and aqueous medium.

25. The process of claim 24 in which the aqueous medium contains an oxygenated organic solvent which is present in amounts less than about 20 percent by weight based on total weight of the aqueous medium.

26. The process of claim 25 in which the organic solvent is a monoalkyl ether of ethylene glycol or diethylene glycol containing from 1 to 4 carbon atoms in the alkyl group.

27. The process of claim 16 in which the polymerization is conducted in the presence of a free radical polymerization initiator which is soluble in the polymerizable alpha, beta-ethylenically unsaturated monomer component.

28. The process of claim 16 in which the polymerization is conducted in the presence of a chain transfer agent which is soluble in the alpha, beta-ethylenically unsaturated monomer component.

29. The process of claim 27 in which the free radical polymerization initiator is selected from the class consisting of peroxides, azo compounds and diazo compounds.

30. The process of claim 28 in which the chain transfer agent is tertiary-dodecyl mercaptan.

* * * * *